United States Patent
Hayashi

(10) Patent No.: US 8,970,748 B2
(45) Date of Patent: Mar. 3, 2015

(54) IMAGING DEVICE, STORAGE MEDIUM STORING A CONTROL PROGRAM FOR IMAGING DEVICE, AND CONTROL METHOD FOR IMAGING DEVICE

(71) Applicant: FUJIFILM Corporation, Tokyo (JP)

(72) Inventor: Kenkichi Hayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/140,169

(22) Filed: Dec. 24, 2013

(65) Prior Publication Data

US 2014/0111673 A1    Apr. 24, 2014

Related U.S. Application Data

(63) Continuation of application No. PCT/JP2012/057385, filed on Mar. 22, 2012.

(30) Foreign Application Priority Data

Jun. 30, 2011    (JP) .................. 2011-146446

(51) Int. Cl.
*H04N 9/73*    (2006.01)
*H04N 9/04*    (2006.01)

(52) U.S. Cl.
CPC ............... *H04N 9/735* (2013.01); *H04N 9/045* (2013.01); *H04N 2209/046* (2013.01)
USPC ............................ 348/280; 348/275; 348/276

(58) Field of Classification Search
USPC .......................................... 348/280, 275, 276
See application file for complete search history.

(56) References Cited

U.S. PATENT DOCUMENTS

| | | | |
|---|---|---|---|
| 6,995,796 B2 | 2/2006 | Taubman | |
| 7,123,299 B1 * | 10/2006 | Yoshida et al. | ............... 348/277 |
| 7,301,565 B2 * | 11/2007 | Kurase | ........................ 348/222.1 |
| 7,554,590 B2 * | 6/2009 | McCaffrey et al. | ........... 348/308 |
| 2002/0149686 A1 | 10/2002 | Taubman | |

(Continued)

FOREIGN PATENT DOCUMENTS

| | | |
|---|---|---|
| JP | 8-23542 A | 1/1996 |
| JP | 8-23543 A | 1/1996 |

(Continued)

OTHER PUBLICATIONS

International Preliminary Report on Patentability issued in International Application No. PCT/JP2012/057385 on Mar. 5, 2013.

(Continued)

*Primary Examiner* — Kelly L Jerabek
*Assistant Examiner* — Abdelaaziz Tissire
(74) *Attorney, Agent, or Firm* — Birch, Stewart, Kolasch & Birch, LLP

(57) ABSTRACT

Correction processing load is reduced even when employing a color filter with a basic array pattern that is large in size. An imaging apparatus divides image data output from an image pickup device into line image data running along a predetermined direction for each line, and when a basic array pattern configuring a color filter has been divided into pattern lines running along the predetermined direction, line correction data that corresponds to the divided line image data is read, the line correction data being configured by plural correction data corresponding to each filter on the pattern line. The read line correction data is used to correct the line image data for each pattern line of the basic array pattern.

18 Claims, 19 Drawing Sheets

(56) References Cited

U.S. PATENT DOCUMENTS

| | | |
|---|---|---|
| 2004/0109068 A1 | 6/2004 | Mitsunaga et al. |
| 2004/0169747 A1 | 9/2004 | Ono et al. |
| 2004/0212707 A1* | 10/2004 | Itoh et al. ............. 348/294 |
| 2005/0041806 A1* | 2/2005 | Pinto et al. ............. 380/210 |
| 2006/0203113 A1 | 9/2006 | Wada et al. |
| 2007/0153104 A1 | 7/2007 | Ellis-Monaghan et al. |
| 2008/0143862 A1* | 6/2008 | Suwa ..................... 348/308 |
| 2008/0151083 A1* | 6/2008 | Hains et al. ............. 348/273 |
| 2009/0027527 A1* | 1/2009 | Pang et al. ............. 348/280 |
| 2011/0019041 A1* | 1/2011 | Ishiwata et al. ......... 348/280 |
| 2011/0069189 A1 | 3/2011 | Venkataraman et al. |
| 2012/0025060 A1 | 2/2012 | Iwata |
| 2012/0293694 A1* | 11/2012 | Hayashi et al. ......... 348/280 |

FOREIGN PATENT DOCUMENTS

| | | |
|---|---|---|
| JP | 11-285012 A | 10/1999 |
| JP | 2000-308080 A | 11/2000 |
| JP | 2004-180059 A | 6/2004 |
| JP | 2004-221839 A | 8/2004 |
| JP | 2004-266369 A | 9/2004 |
| JP | 2005-51393 A | 2/2005 |
| JP | 2005-136766 A | 5/2005 |
| JP | 2005-341561 A | 12/2005 |
| JP | 2007-184904 A | 7/2007 |
| JP | 2007-306490 A | 11/2007 |
| JP | 2008-236620 A | 10/2008 |
| JP | 2008-288649 A | 11/2008 |
| JP | 2009-177418 A | 6/2009 |
| JP | 2010-512048 A | 4/2010 |
| JP | 2010-153511 A | 7/2010 |
| JP | 2011-523538 A | 8/2011 |
| WO | WO 02/056604 A1 | 7/2002 |
| WO | 2008/066698 A2 | 6/2008 |
| WO | WO 2009/151903 A2 | 12/2009 |

OTHER PUBLICATIONS

International Search Report issued in International Application No. PCT/JP2012/057385 on Jun. 5, 2012.

Office Action issued in Chinese Patent Application No. 201180022503.3 on May 23, 2013.

PCT/ISA/237—mailed on Jun. 5, 2012, issued in PCT/JP2012/057385.

Written Opinion of the ISA issued in International Application No. PCT/JP2012/080898 on Jan. 22, 2013.

Written Opinion of the ISA issued in International Application No. PCT/JP2012/080899 on Jan. 15, 2013.

Written Opinion of the ISA issued in International Application No. PCT/JP2012/081644 on Jan. 15. 2013.

Written Opinion of the ISA issued in International Application No. PCT/JP2012/083583 on Jan. 29, 2013.

Chinese Office Action issued in Chinese Application No. 201280031720.3 on Dec. 5, 2014.

\* cited by examiner

A ARRAY    B ARRAY

FIG.5

| R00 | G10 | G20 | B30 | G40 | G50 | R60 |
|-----|-----|-----|-----|-----|-----|-----|
| G01 | B11 | R21 | G31 | R41 | B51 | G61 |
| G02 | R12 | B22 | G32 | B42 | R52 | G62 |
| B03 | G13 | G23 | R33 | G43 | G53 | B63 |
| G04 | R14 | B24 | G34 | B44 | R54 | G64 |
| G05 | B15 | R25 | G35 | R45 | B55 | G65 |
| R06 | G16 | G26 | B36 | G46 | G56 | R66 |

FIG.6

| R00 | G10 | G20 | B30 | G40 | G50 | R60 |
|-----|-----|-----|-----|-----|-----|-----|
| G01 | B11 | R21 | G31 | R41 | B51 | G61 |
| G02 | R12 | B22 | G32 | B42 | R52 | G62 |
| B03 | G13 | G23 | R33 | G43 | G53 | B63 |
| G04 | R14 | B24 | G34 | B44 | R54 | G64 |
| G05 | B15 | R25 | G35 | R45 | B55 | G65 |
| R06 | G16 | G26 | B36 | G46 | G56 | R66 |

FIG.15

| G | R | B | G | G | R | B | G |
|---|---|---|---|---|---|---|---|
| B | G | G | R | B | G | G | R |
| R | G | G | B | R | G | G | B |
| G | B | R | G | G | B | R | G |
| G | R | B | G | G | R | B | G |
| B | G | G | R | B | G | G | R |
| R | G | G | B | R | G | G | B |
| G | B | R | G | G | B | R | G |

FIG.16

| G | G | G | R | B | G | G | G | R | B |
|---|---|---|---|---|---|---|---|---|---|
| B | G | R | G | G | B | G | R | G | G |
| R | B | G | R | B | R | B | G | R | B |
| G | G | B | G | R | G | G | B | G | R |
| B | R | G | G | G | B | R | G | G | G |
| G | G | G | R | B | G | G | G | R | B |
| B | G | R | G | G | B | G | R | G | G |
| R | B | G | R | B | R | B | G | R | B |
| G | G | B | G | R | G | G | B | G | R |
| B | R | G | G | G | B | R | G | G | G |

FIG.17

| G | R | B | G | R | B | G | G | R | B | G | R | B | G |
|---|---|---|---|---|---|---|---|---|---|---|---|---|---|
| R | G | G | B | G | G | R | R | G | G | B | G | G | R |
| B | G | G | R | G | G | B | B | G | G | R | G | G | B |
| G | R | B | G | B | R | G | G | R | B | G | B | R | G |
| B | G | G | R | G | G | B | B | G | G | R | G | G | B |
| R | G | G | B | G | G | R | R | G | G | B | G | G | R |
| G | B | R | G | B | R | G | G | B | R | G | B | R | G |
| G | R | B | G | R | B | G | G | R | B | G | R | B | G |
| R | G | G | B | G | G | R | R | G | G | B | G | G | R |
| B | G | G | R | G | G | B | B | G | G | R | G | G | B |
| G | R | B | G | B | R | G | G | R | B | G | B | R | G |
| B | G | G | R | G | G | B | B | G | G | R | G | G | B |
| R | G | G | B | G | G | R | R | G | G | B | G | G | R |
| G | B | R | G | B | R | G | G | B | R | G | B | R | G |

FIG.18

| R | B | G | R | B | R | G | B | R | B | G | R | B | R | G | B |
|---|---|---|---|---|---|---|---|---|---|---|---|---|---|---|---|
| G | G | G | B | G | G | G | R | G | G | G | B | G | G | G | R |
| B | G | G | G | R | G | G | G | B | G | G | G | R | G | G | G |
| R | G | B | R | B | G | R | B | R | G | B | R | B | G | R | B |
| B | R | G | B | R | B | G | R | B | R | G | B | R | B | G | R |
| G | G | G | R | G | G | G | B | G | G | G | R | G | G | G | B |
| R | G | G | G | B | G | G | G | R | G | G | G | B | G | G | G |
| B | G | R | B | R | G | B | R | B | G | R | B | R | G | B | R |
| R | B | G | R | B | R | G | B | R | B | G | R | B | R | G | B |
| G | G | G | B | G | G | G | R | G | G | G | B | G | G | G | R |
| B | G | G | G | R | G | G | G | B | G | G | G | R | G | G | G |
| R | G | B | R | B | G | R | B | R | G | B | R | B | G | R | B |
| B | R | G | B | R | B | G | R | B | R | G | B | R | B | G | R |
| G | G | G | R | G | G | G | B | G | G | G | R | G | G | G | B |
| R | G | G | G | B | G | G | G | R | G | G | G | B | G | G | G |
| B | G | R | B | R | G | B | R | B | G | R | B | R | G | B | R |

FIG.19

| R | B | G | R | B | R | E | B | R | B | G | R | B | R | E | B |
|---|---|---|---|---|---|---|---|---|---|---|---|---|---|---|---|
| G | G | G | B | E | G | G | R | G | G | G | B | E | G | G | R |
| B | G | G | G | R | G | G | E | B | G | G | G | R | G | G | E |
| R | G | B | R | B | E | R | B | R | G | B | R | B | E | R | B |
| B | R | E | B | R | B | G | R | B | R | E | B | R | B | G | R |
| E | G | G | R | G | G | G | B | E | G | G | R | G | G | G | B |
| R | G | G | E | B | G | G | G | R | G | G | E | B | G | G | G |
| B | E | R | B | R | G | B | R | B | E | R | B | R | G | B | R |
| R | B | G | R | B | R | E | B | R | B | G | R | B | R | E | B |
| G | G | G | B | E | G | G | R | G | G | G | B | E | G | G | R |
| B | G | G | G | R | G | G | E | B | G | G | G | R | G | G | E |
| R | G | B | R | B | E | R | B | R | G | B | R | B | E | R | B |
| B | R | E | B | R | B | G | R | B | R | E | B | R | B | G | R |
| E | G | G | R | G | G | G | B | E | G | G | R | G | G | G | B |
| R | G | G | E | B | G | G | G | R | G | G | E | B | G | G | G |
| B | E | R | B | R | G | B | R | B | E | R | B | R | G | B | R |

IMAGING DEVICE, STORAGE MEDIUM STORING A CONTROL PROGRAM FOR IMAGING DEVICE, AND CONTROL METHOD FOR IMAGING DEVICE

CROSS-REFERENCE TO RELATED APPLICATIONS

This application is a continuation application of International Application No. PCT/JP2012/057385, filed Mar. 22, 2012, the disclosure of which is incorporated herein by reference in its entirety. Further, this application claims priority from Japanese Patent Application No. 2011-146446, filed Jun. 30, 2011.

BACKGROUND

1. Technical Field

The present invention relates to an imaging apparatus, an imaging apparatus control program, and an imaging apparatus control method, and in particular relates to an imaging apparatus, an imaging apparatus control program, and an imaging apparatus control method provided with a color filter.

2. Related Art

Processing is normally performed on image capture signals captured by an image pickup device to improve and correct deterioration in image quality caused by for example characteristics of the image pickup device (see for example Patent Document 1 and Patent Document 2).

For example, when correcting an image capture signal captured by an imaging apparatus provided with a color filter in which plural different colored filters are placed in a predetermined pattern, processing is necessary to set and correct parameters (correction data) for each color definition obtained by each pixel from the image pickup device.

Color filters are configured by repeatedly disposed predetermined basic array patterns. The types of color definition are accordingly determined by the size of the basic array pattern. For example, a maximum of 4 types of correction values is sufficient for 2×2 pixels worth in cases in which the basic array pattern is a conventional Bayer array.

PATENT DOCUMENTS

Patent Document 1: Japanese Patent Application Laid-Open (JP-A) No. 2008-288649
Patent Document 2: JP-A No. 2009-177418

However, an issue arises when employing a color filter with an array larger in size than that of a Bayer array, since the correction data required in order to for example determine a brightness correlation direction and make appropriate correction increases, thereby increasing the processing load of correction processing.

SUMMARY

In consideration of the above issue, an object of the present invention is to provide an imaging apparatus, an imaging apparatus control program, and an imaging apparatus control method capable of reducing the correction processing load even when employing a color filter with a basic array pattern that is large in size.

In order to address the above issue, an imaging apparatus of the present invention includes: an image pickup device including plural photoelectric conversion elements arrayed in a horizontal direction and a vertical direction; a color filter that is provided above plural pixels configured by the plural photoelectric conversion elements, the color filter having repeatedly disposed basic array patterns of plural filters respectively corresponding to plural different colors that are placed in a predetermined pattern in the horizontal direction and the vertical direction; a division section that divides image data output from the image pickup device into line image data running along a predetermined direction for each line; a storage section that, when the basic array pattern has been divided into pattern lines running along the predetermined direction, is stored for each pattern line with line correction data configured by plural correction data corresponding to each filter on the pattern line; and a correction section that reads from the storage section line correction data corresponding to the line image data divided by the division section, and that uses the read line correction data to correct the line image data for each pattern line.

According to the present invention, the line correction data running along the predetermined direction of the basic array pattern is prepared for each pattern line, and the image data is divided into the line image data and corrected per line image data. The correction processing load can be reduced in comparison to when correction is performed per basic array pattern, even when employing a color filter with a basic array pattern that is large in size, namely a color filter with a lot of color definitions. Note that the predetermined direction may for example be any out of the horizontal direction, the vertical direction or the diagonal directions.

Moreover, the first filter corresponding to the first color that contributes most to obtaining a brightness signal is placed such that in the basic array pattern there are portions where there are 2 or more of the first filters adjacent to each other in the horizontal direction, the vertical direction and the diagonal directions (NE, NW). Accordingly, the direction out of the 4 directions above that is a brightness correlation direction can be determined using the smallest pixel separation based on difference values between the pixel values of the adjacent first color pixels in each of the directions. Accordingly, when computing other color pixel values at pixel positions of pixels subject to synchronization processing extracted from a mosaic image output from a color image pickup device, the pixel values of the other color pixels can be estimated with good precision by employing the pixel values of the other color pixels present in the correlation direction according to the brightness correlation direction determined using the smallest pixel separation pixel values as described above, thereby enabling the occurrence of false color in high frequency portions to be suppressed.

Note that configuration may be made further including: a thinning section that reads from the image pickup device line image data that is thinned to a predetermined thinning pattern when an image capture mode is a video mode; and wherein the correction section reads from the storage section line correction data corresponding to the line image data that has been read by the thinning section, and corrects the line image data with the read line correction data.

According to the present invention, when image data is thinned and read when the image capture mode is the video mode, it is sufficient to read the line correction data corresponding to the read line image data, and the correction processing load in the video mode can be reduced.

Moreover, configuration may be made wherein: in the color filter, one or more of the first filter and one or more of each of the second filters respectively corresponding to the second colors are respectively placed in each horizontal direction line and each vertical direction line of the color filter inside the basic array pattern.

Moreover, configuration may be made wherein: the basic array pattern is a square array pattern corresponding to N×N pixels, wherein N is an integer of 4 or above.

Moreover, configuration may be made wherein: the color filter contains a square array corresponding to 2×2 pixels configured by the first filter.

According to the present invention, the direction out of the 4 directions above that is the brightness correlation direction can be determined using the smallest pixel separation based on difference values between the pixel values of each of the 4 pixels of the square array corresponding to the 2×2 pixels.

Moreover, configuration may be made wherein: the first color is green (G), and the second colors are red (R) and blue (B).

Moreover, configuration may be made wherein: the color filter includes a R filter, a G filter and a B filter corresponding respectively to the colors red (R), green (G), and blue (B); and the color filter is configured by a first array and a second array alternately arrayed in the horizontal direction and the vertical direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

According to the present invention, when 5×5 pixels (a local region of a mosaic image) centered on the first array or the second array are considered in isolation, mutually adjacent G pixels are present on each of both sides of the central pixel (R pixel or B pixel) of the 5×5 pixels in the horizontal direction and the vertical direction respectively. Pixel values of these G pixels (8 pixels in total) can be employed to determine the correlation direction out of 4 directions.

Moreover, configuration may be made wherein: the color filter includes a R filter, a G filter and a B filter corresponding respectively to the colors red (R), green (G), and blue (B); and the color filter is configured by a first array and a second array alternately arrayed in the horizontal direction and the vertical direction, wherein the first array corresponds to 3×3 pixels with the G filter placed at the center and at the 4 corners, the B filter placed at the top and bottom of the central G filter, and the R filter placed at the left and right of the central G filter, and the second array corresponds to 3×3 pixels with the G filter placed at the center and at the 4 corners, the R filter placed at the top and bottom of the central G filter, and the B filter placed at the left and right of the central G filter.

According to the present invention, when 5×5 pixels (a local region of a mosaic image) centered on the first array or the second array are considered in isolation, 2×2 G pixels are present in the 4 corners of the of the 5×5 pixels. The pixel values of these 2×2 G pixels can be employed to determine the correlation direction from out of 4 directions.

Moreover, configuration may be made wherein: in the color filter, the first filter is respectively placed contiguously in the horizontal direction and the vertical direction on both sides of the filter of any one color out of the second filters.

According to the present invention, the direction out of the 4 directions above that is the brightness correlation direction can be determined using the smallest pixel separation based on difference values between the pixel values of the contiguous pixels corresponding to the first filter.

Moreover, configuration may be made wherein: the color filter has point symmetry about the center of the basic array pattern.

According to the present invention, the circuit scale of a later stage processing circuit can be made smaller.

An imaging apparatus control program of the present invention causes a computer that controls an imaging apparatus including: an image pickup device including plural photoelectric conversion elements arrayed in a horizontal direction and a vertical direction, a color filter that is provided above plural pixels configured by the plural photoelectric conversion elements, the color filter having a basic array pattern disposed with a first filter corresponding to a first color that contributes most to obtaining a brightness signal and second filters respectively corresponding to 2 or more second colors other than the first color, with the basic array pattern disposed repeating in the horizontal direction and the vertical direction, and with the first filter placed such that in the basic array pattern there are portions where there are 2 or more of the first filters adjacent to each other in the horizontal direction, the vertical direction and the diagonal directions, and a storage section that, when the basic array pattern has been divided into pattern lines running along a predetermined direction, is stored for each pattern line with line correction data configured by plural correction data corresponding to each filter on the pattern line, to function as: a division section that divides image data output from the image pickup device into line image data running along the predetermined direction for each line; and a correction section that reads from the storage section line correction data corresponding to the line image data divided by the division section, and that uses the read line correction data to correct the line image data for each pattern line.

Advantageous Effects of Invention

The present invention exhibits the advantageous effect of enabling an increase in correction processing load to be prevented even when employing a color filter with a basic array pattern that is large in size.

BRIEF DESCRIPTION OF DRAWINGS

FIG. 5 is a diagram to explain a pixel interpolation method during synchronization processing when a vertical direction has been determined to be a correlation direction.

FIG. 6 is a diagram to explain a pixel interpolation method during synchronization processing when a top left to bottom right diagonal direction has been determined to be a correlation direction.

FIG. 15 is a configuration diagram of a color filter according to a fourth exemplary embodiment.

FIG. 16 is a configuration diagram of a color filter according to a fifth exemplary embodiment.

FIG. 17 is a configuration diagram of a color filter according to a sixth exemplary embodiment.

FIG. 18 is a configuration diagram of a color filter according to a seventh exemplary embodiment.

FIG. 19 is a configuration diagram of a color filter according to the seventh exemplary embodiment.

DESCRIPTION OF EMBODIMENTS

Explanation follows regarding exemplary embodiments of the present invention, with reference to the drawings.

First Exemplary Embodiment

Figure 1:
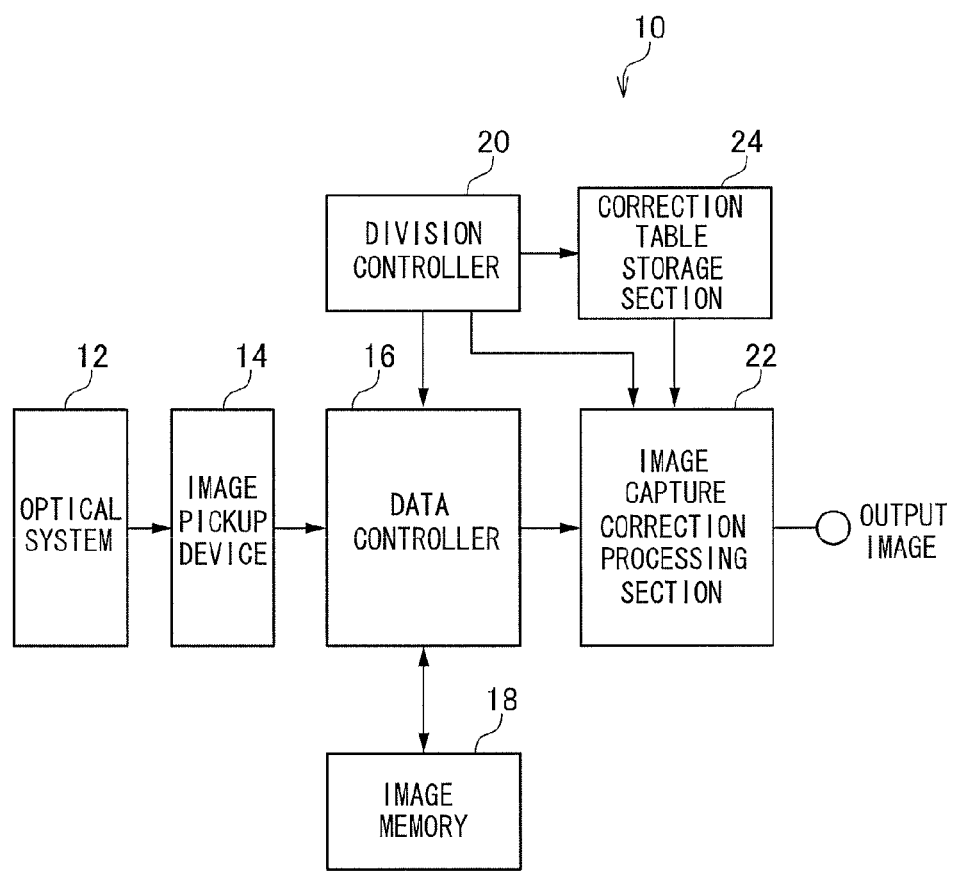
FIG. 1 is a schematic block diagram of an imaging apparatus according to a first exemplary embodiment.

FIG. 1 is a schematic block diagram illustrating an imaging apparatus 10 according to the present exemplary embodiment. The imaging apparatus 10 is configured including an optical system 12, an image pickup device 14, a data controller 16, an image memory 18, a division controller 20, an image capture correction processing section 22, and a correction table storage section 24.

The optical system 12 is configured including for example a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS) containing plural photoelectric conversion elements arrayed in the horizontal direction and the vertical direction, with a color filter disposed above the image pickup device.

Figure 2:
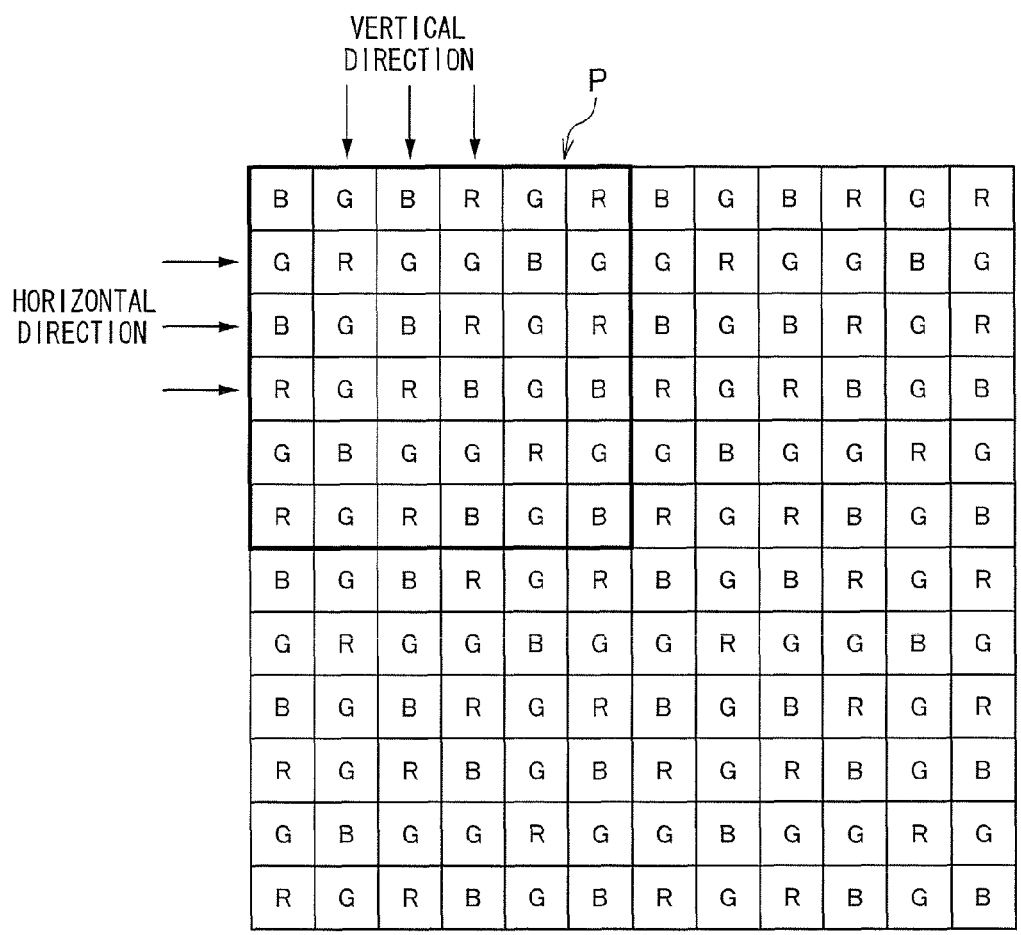
FIG. 2 is a configuration diagram of a color filter according to the first exemplary embodiment.

FIG. 2 illustrates a portion of a color filter according to the present exemplary embodiment. One out of 3 primary color filters red (R), green (G) and blue (B) is placed over each of the pixels.

Color Filter Array Features

The color filter of the first exemplary embodiment includes the following features (1), (2), (3) and (4).

Feature (1)

The color filter illustrated in FIG. 2 includes a basic array pattern P (the pattern indicated by the bold frame) formed from a square array pattern corresponding to 6×6 pixels, with the basic array pattern P disposed so as to repeat in both the horizontal direction and the vertical direction. Namely, the color filter is arrayed such that the respective filters of each color R, G, B (the R filters, G filters, B filters) have a specific periodicity.

Thus arraying the R filters, G filters and B filters with a specific periodicity enables processing to be performed in a repeating pattern during for example synchronization (interpolation) processing (also referred to as mosaic processing) of R, G, B signals read from the color image pickup device.

Moreover, when images are reduced by thinning processing in basic array pattern P units, the color filter array of the thinning processed reduced image can be made similar to the color filter array prior to thinning processing, enabling a common processing circuit to be employed.

Feature (2)

The basic array pattern P configuring the color filter illustrated in FIG. 2 has one or more of the G filter, that corresponds to the color contributing the most to obtaining a brightness signal (the color G in the present exemplary embodiment), and one or more of the R filters and the B filters that correspond to the colors other than G (R, B in the present exemplary embodiment) placed in each line in the horizontal direction and vertical direction inside the basic array pattern.

The R, G, and B filters are respectively placed in each line in the horizontal direction and vertical direction in the basic array pattern P, thereby enabling color moiré (false color) generation to be suppressed.

Feature (3)

The G filters that correspond to brightness system pixels are placed inside the basic array pattern P such that the basic array pattern P contains portions where there are 2 or more of the G filters adjacent to each other in each direction of the horizontal direction, vertical direction and the diagonal directions (NE, NW).

Figure 3:
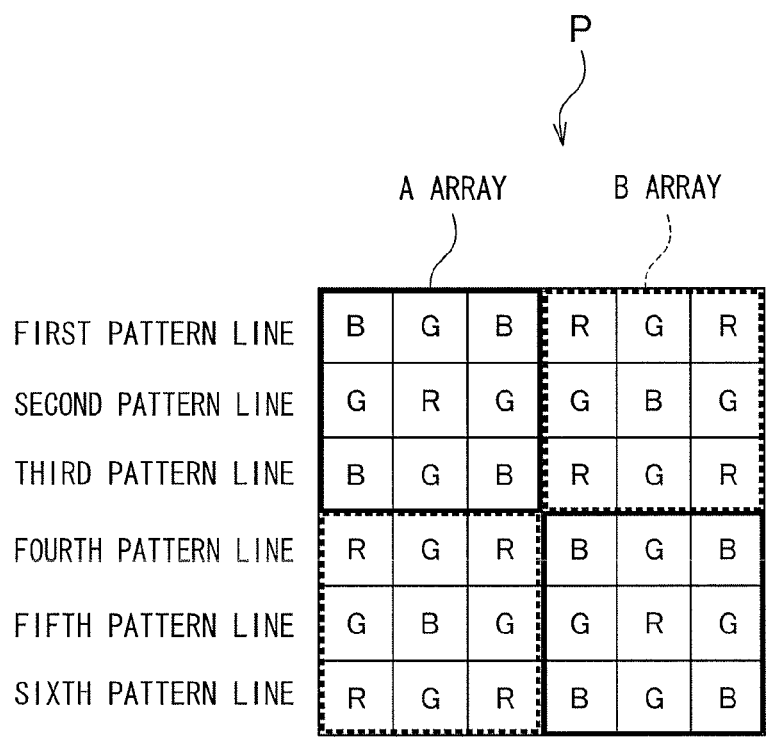
FIG. 3 is a diagram illustrating a basic array pattern contained in a color filter according to the first exemplary embodiment.

FIG. 3 illustrates the basic array pattern P illustrated in FIG. 2 in a state split into 4 groups of 3×3 pixels.

As illustrated in FIG. 3, the basic array pattern P may also be considered an array in which an A array of the 3×3 pixels surrounded by the solid line frame and a B array of the 3×3 pixels surrounded by the broken line frame are arranged alternately along the horizontal direction and the vertical direction.

In the A array the R filter is placed at the center, the B filters are placed at the 4 corners, and the G filters are placed on each side of the central R filter to the top and bottom and left and right. In the B array, the B filter is placed at the center, the R filters are placed at the 4 corners, and the G filters are placed on each side of the central B filter to the top and bottom and left and right. The A array and the B array have reverse positional relationships for the R filters and the B filters, but have the same placement otherwise.

Figures 4A, 4B:
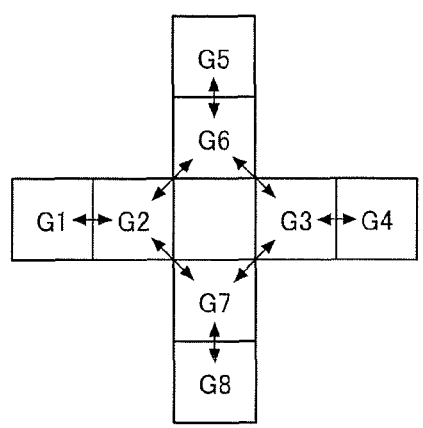
FIG. 4A is a diagram illustrating a color filter in which 6×6 pixel basic array patterns contained in a color filter according to the first exemplary embodiment are split into 3×3 pixel A arrays and B arrays that are repeatedly disposed along a horizontal direction and a vertical direction.
FIG. 4B is a diagram illustrating a distinctive placement of G pixels in the color filter of FIG. 4A.

As illustrated in FIG. 4A, the color filter of the first exemplary embodiment may also be considered a repeating array in which the A array and the B array are alternately disposed in the horizontal direction and the vertical direction.

When, as illustrated in FIG. 4A, in a mosaic image output from the image pickup device 14, a 5×5 pixel local region (the region illustrated by the bold frame) centered on the A array is considered in isolation, 8 individual G pixels in this local region are placed in a cross shape as illustrated in FIG. 4B. Taking these G pixels as G1, G2, G3, G4 in sequence from left to right, and as G5, G6, G7, G8 in sequence from top to bottom, then the pixels G1, G2 and the pixels G3, G4 are respectively adjacent to each other in the horizontal direction, the pixels G5, G6 and the pixels G7, G8 are respectively adjacent to each other in the vertical direction, the pixels G6, G3 and the pixels G2, G7 are respectively adjacent to each other in the top left to bottom right diagonal direction, and the pixels G6, G2 and the pixels G3, G7 are respectively adjacent to each other in the bottom left to top right diagonal direction.

Consequently, by deriving difference absolute values between the pixel values of these adjacent pixels, the direction out of each of the horizontal, vertical and diagonal (NE, NW) directions having the smallest change in brightness (a correlation direction with high correlation) can be determined using the smallest pixel separation.

Namely, the sum of the difference absolute values in the horizontal direction is |G1−G2|+|G3−G4|, the sum of the difference absolute values in the vertical direction is |G5−G6|+|G7−G8|, the sum of the difference absolute values in the bottom left to top right diagonal direction is |G6−G2|+|G3−G7|, and the sum of the difference absolute values in the top left to bottom right diagonal direction is |G6−G3|+|G2−G7|.

The correlation (correlation direction) can then be determined as the direction with the smallest difference absolute value out of these four correlation absolute values. Note that the determined correlation direction can be employed during for example synchronization (interpolation) processing.

Interpolation Method Employing Correlation Direction

Explanation follows regarding an interpolation method employing the correlation direction determined as described above.

When the vertical direction has been determined as a correlation direction, as illustrated in FIG. 5, and other color pixel values are interpolated for each pixel position of the 3×3 pixels (A array) shown inside the bold frame in FIG. 5, the pixel values of pixels of the same color that are present in the vicinity along the correlation direction are employed.

When interpolating G pixel values, G pixel values G22', G24' for the pixel positions B22, B24 employ the pixel value of G23, and G pixel values G42', G44' for the pixel positions B42, B44 employ the pixel value of G43. However, a G pixel value G33' for the pixel position R33 employs an average value of the pixel values of G32 and G34.

When interpolating R and B pixel values, the R pixel value R22' for the pixel position B22 employs the pixel value of R21, and R and B pixel values R23', B23' for the pixel position G23 respectively employ an average value of the pixel values of R21, R25 and an average value of the pixel values of B22, B24. R pixel values R22', R24' for the pixel positions B22, B24 respectively employ the pixel values of R21, R25.

R and B pixel values R32', B32' for the pixel position G32 respectively employ the pixel values of R33, B30, and a B pixel value B33' for the pixel position R33 employs an average value of the pixel values of B30, B36. R and B pixel values R34', B34' for the pixel position G34 respectively employ the pixel values of R33, B36.

An R pixel value R42' for the pixel position B42 employs the pixel value of R41, and R and B pixel values R43', B43' for the pixel position G43 respectively employ an average value of the pixel values of R41 and R45 and an average value of the pixel values of B42 and B44. An R pixel value R44' for the pixel position B44 employs the pixel value of R45.

Interpolation of RGB pixel values in the B array is performed using similar processing, but with R and B reversed.

The RGB pixel values are interpolated by repeating the above processing for each 3×3 pixels.

However, when the top left to bottom right diagonal direction has been determined as a correlation direction, as illustrated in FIG. 6, and other color pixel values are interpolated for each pixel position of the 3×3 pixels (A array) shown inside the bold frame in FIG. 6, when pixels of the color to be interpolated are present in the vicinity along the correlation direction, the pixel values thereof are employed, however when pixels of the color to be interpolated are not present in the correlation direction, difference or ratio (color difference or color ratio) relationships of the RGB pixel values of already interpolated pixels that are present in the vicinity are employed for interpolation.

Firstly, interpolation is performed from pixels of the color to be interpolated that are present in an interpolation direction. In FIG. 6, an R pixel value R22' for the pixel position B22 employs the pixel value of R33, an R pixel value R32' for the pixel position G32 employs the pixel value of R21, and a G pixel value G42' for the pixel position B42 employs an average value of the pixel values of G31 and G53. R23', B33', R43', G24', R34' and R44' similarly employ the pixel values of pixels of the color to be interpolated that are present along the correlation direction.

Explanation follows regarding an interpolation processing method for pixels for which pixels of the color to be interpolated are not present along the correlation direction.

When performing interpolation to derive a G pixel value G22' for the pixel position B22 illustrated in FIG. 6, interpolation is performed employing color differences between G13 and the interpolated pixel value B 13', and between G31 and the interpolated pixel value B31'. Specifically, the value is computed following the calculation of the formula below.

$$G22'=B22+(G13+G31)/2-(B13'+B31')/2 \qquad \text{Formula 1}$$

Similarly, the interpolation method for a B pixel value B32' for the pixel position G32 and an R pixel value R42' for the pixel position B42 uses the formulae below.

$$B32'=G32+B31'-G31$$

$$R42'=B42+R33-B33' \qquad \text{Formula 2}$$

Interpolation of B32', G33', B43', R24', B34' and G44' is performed using similar processing.

The RGB pixel values are interpolated by repeating the above processing for each 3×3 pixels.

Note that due to the symmetry of the RGB color filters in the A array and the B array, even when the correlation direction is determined to be the horizontal direction or the bottom left to top right diagonal direction, the RGB pixel values can be derived by interpolation similarly to when the correlation direction is determined to be the vertical direction or the top left to bottom right diagonal direction as described above.

Moreover, Formula 1 and Formula 2 above are used to perform interpolation employing color difference, however interpolation may be performed employing color ratio.

Feature (4)

The basic array pattern P configuring the color filter illustrated in FIG. 2 has point symmetry around the center of the basic array pattern P.

As illustrated in FIG. 3, the A arrays and the B arrays in the basic array pattern are configured with point symmetry about the central R filter or B filter respectively, and also with symmetry (line symmetry) in the up-down and left-right directions.

Such symmetry enables the circuit scale of a later stage processing circuit to be made smaller and to be simplified.

Note that plural basic array patterns exist that enable configuration of the color filter illustrated in FIG. 2 by repeatedly disposing the basic array patterns in the horizontal direction and vertical direction. In the first exemplary embodiment, the basic array pattern P that is the basic array pattern with point symmetry is, for convenience, referred to as the basic array pattern.

Note that plural basic array patterns also exist for each of the color filters of the other exemplary embodiments that are described later, however a typical version is referred to as the basic array pattern of those color filters.

The data controller 16 temporarily stores image data output from the image pickup device 14 in the image memory 18, and follows instruction from the division controller 20 to divide the image data stored in the image memory 18 into horizontal direction line image data for each line, and outputs the divided line image data in sequence to the image capture correction processing section 22.

When the basic array pattern P is divided into pattern lines along the horizontal direction, the correction table storage section 24 is stored in advance for each pattern line with pattern line correction data configured by plural correction data corresponding to each filter on the pattern line.

As illustrated in FIG. 3, since the basic array pattern P of the color filter according to the present exemplary embodiment corresponds to 6×6 pixels, the correction table storage section 24 is stored with a correction table configured by first line correction data to sixth line correction data corresponding to each line from a first pattern line to a sixth pattern line. Since the color filter is configured by repeatedly disposing the basic array pattern P, the correction table storage section 24 need only be stored with a correction table for 6×6 pixels. Note that the correction table is correction data for correcting deterioration in image quality caused by the color filter array.

According to instruction from the division controller 20, the image capture correction processing section 22 reads line correction data for each line from the correction table storage section 24 and corrects the line image data output from the data controller 16 for each pattern line of the basic array pattern. Namely, when the line image data is line image data for an $(n+1)^{th}$ line (n=0, 1, 2, and so on), the image capture correction processing section 22 reads the first line correction data from the correction table storage section 24 and performs correction. Similarly, when the line image data is line image data for an $(n+2)^{th}$ line, second line correction data is read and correction performed. When the line image data is line image data for an $(n+3)^{th}$ line, third line correction data is read and correction performed. When the line image data is line image data for an $(n+4)^{th}$ line, fourth line correction data is read and correction performed. When the line image data is line image data for an $(n+5)^{th}$ line, fifth line correction data is read and correction performed. When the line image data is line image data for an $(n+6)^{th}$ line, sixth line correction data is read and correction performed.

Figure 7:
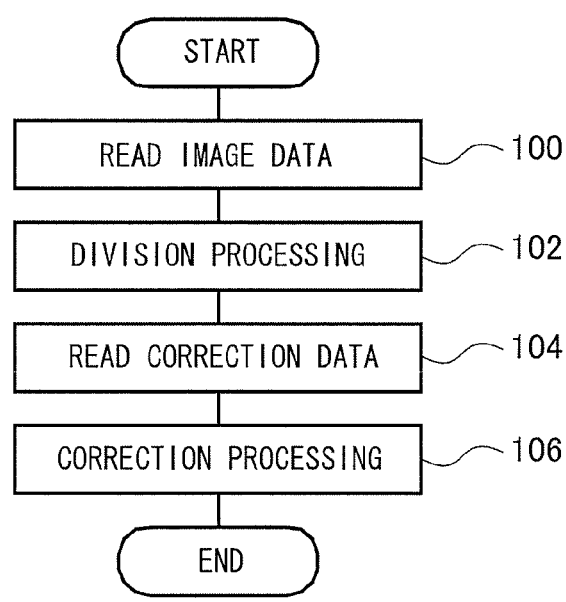
FIG. 7 is a flow chart illustrating processing executed by an imaging apparatus.

Explanation follows regarding processing performed by the imaging apparatus 10 as operation of the present exemplary embodiment, with reference to the flow chart illustrated in FIG. 7.

First at step 100, the data controller 16 reads image data from the image pickup device 14 and stores it sequentially in the image memory 18.

At step 102, according to instruction from the division controller 20, the data controller 16 divides the image data stored in the image memory 18 into horizontal direction line image data for each line, and sequentially outputs the divided line image data to the image capture correction processing section 22.

At step 104, according to instruction from the division controller 20, the image capture correction processing section 22 reads the line correction data for each line from the correction table storage section 24.

Figure 8:
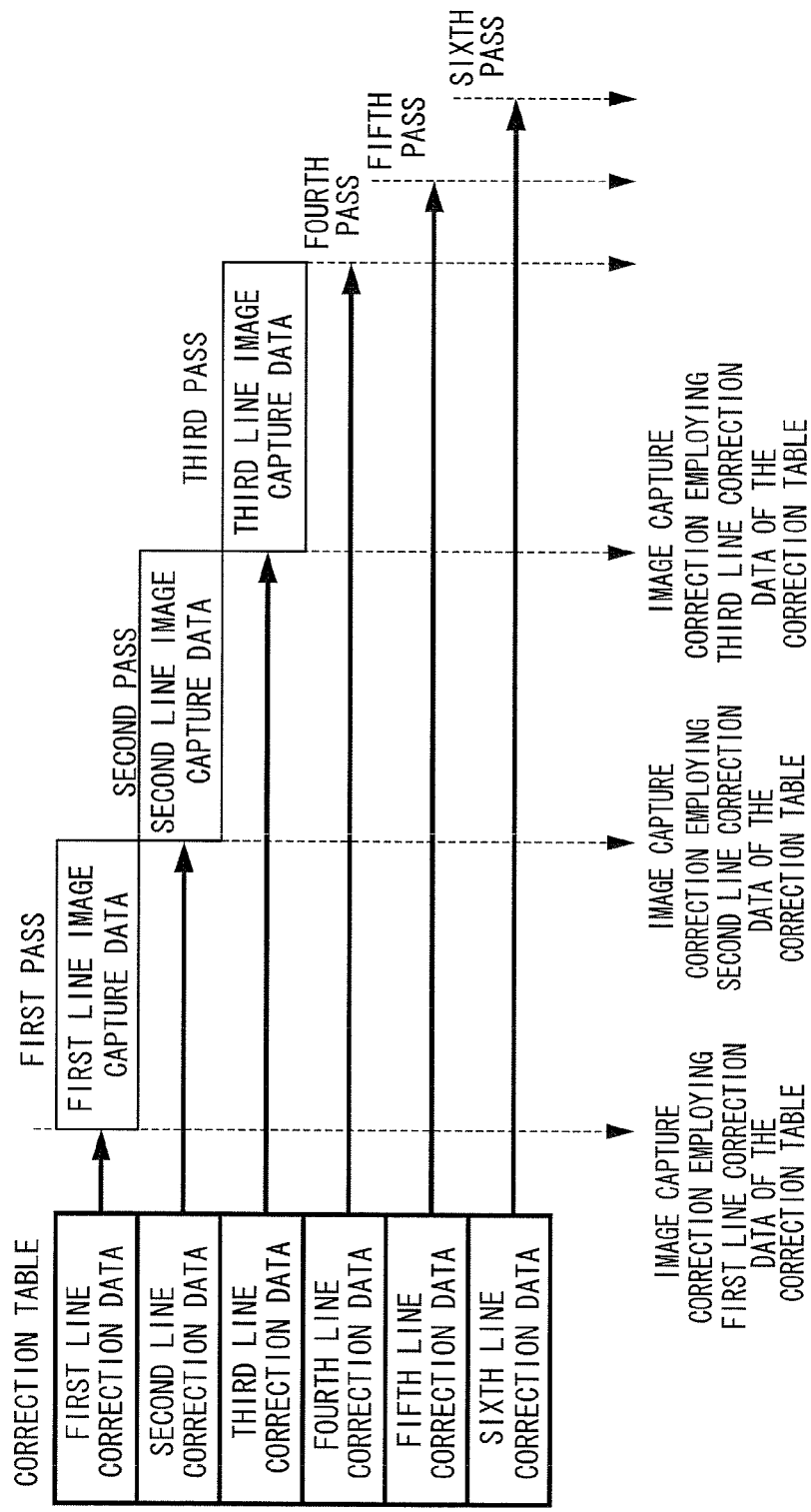
FIG. 8 is a diagram to explain a case in which line correction data is employed to perform correction per line image data in an imaging apparatus according to the first exemplary embodiment.

At step 106, the image capture correction processing section 22 corrects the line image data output from the data controller 16 for each pattern line of the basic array pattern based on the line correction data read from the correction table storage section 24. Namely, as illustrated in FIG. 8, the line image data of the $(n+1)^{th}$ to the $(n+6)^{th}$ lines is corrected in sequence based on the respective first line correction data to the sixth line correction data. Similar processing is repeated until it has been performed on all of the line image data of the image data.

The corrected line image data is output to for example a later stage synchronization circuit, not illustrated in the drawings. In the synchronization circuit, synchronization (interpolation) processing based on the determined correlation direction is performed as described above.

Due to thus preparing the line correction data along the basic array pattern horizontal direction for each pattern line and dividing the image data into line image data and correcting per line image data, the correction processing load can be reduced in comparison to when correction is performed per basic array pattern even when employing a color filter with a large size of basic array pattern, namely a color filter with a lot of color definitions. Note that in the present exemplary embodiment, explanation has been given wherein line correction data along the basic array pattern horizontal direction is prepared for each pattern line, and the image data is divided into horizontal direction line image data and correction is performed per line image data. There is however no limitation thereto, and for example line correction data may be prepared for each vertical direction pattern line in the basic array pattern, and the image data may be split into vertical direction line image data and correction performed per line image data.

Moreover, the imaging apparatus 10 may be configured with a computer that includes for example a CPU, ROM, RAM and non-volatile ROM. In such cases a processing program for the above processing may, for example, be pre-stored on the non-volatile ROM, and then executed by reading into the CPU.

Second Exemplary Embodiment

Explanation follows regarding a second exemplary embodiment of the present exemplary embodiment. In the present exemplary embodiment, explanation is given regarding a case in which video processing is performed on an image captured in a video mode. Note that portions similar to those of the first exemplary embodiment are allocated the same reference numerals, and detailed explanation thereof is omitted.

Figure 9:
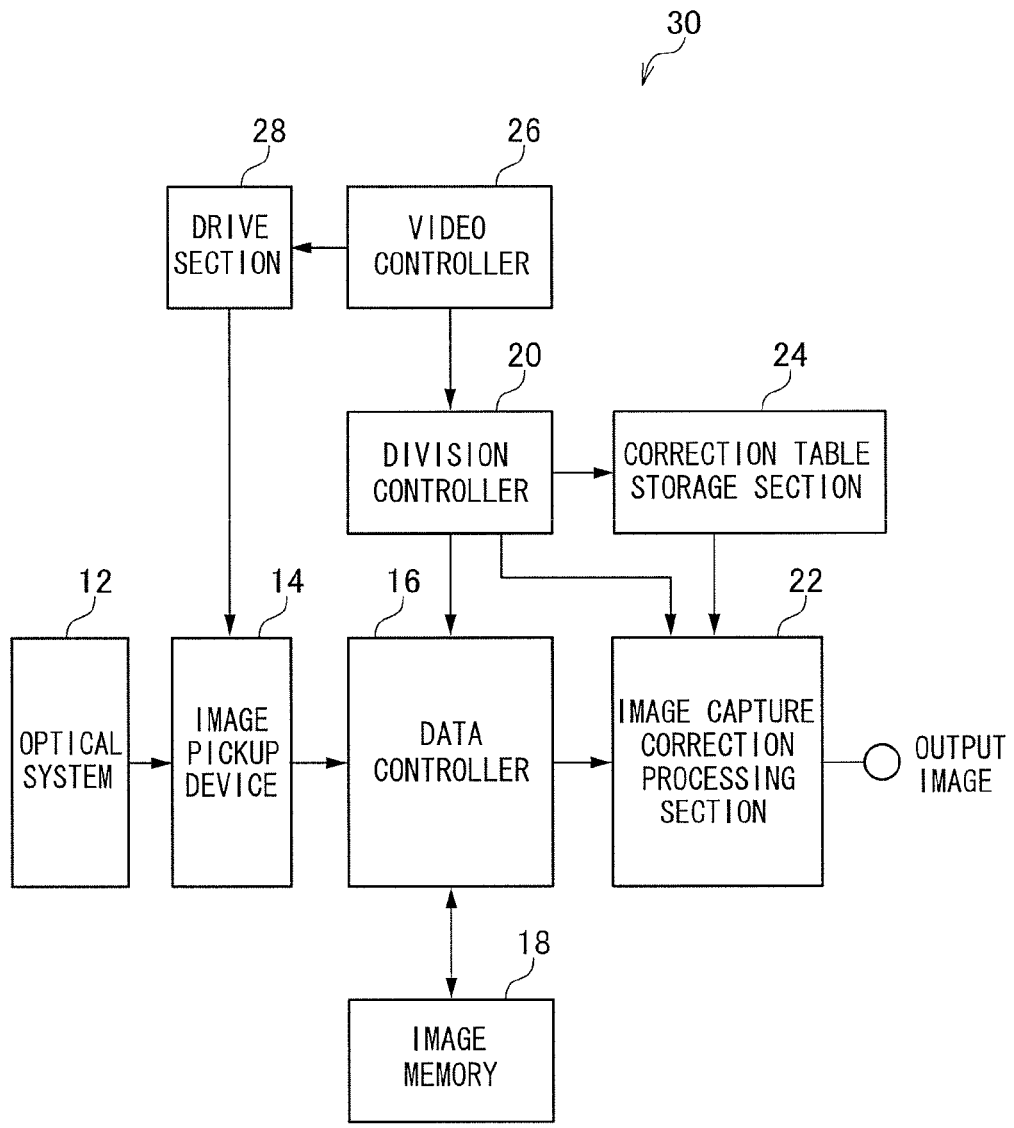
FIG. 9 is a schematic block diagram of an imaging apparatus according to a second exemplary embodiment.

FIG. 9 illustrates an imaging apparatus 30 according to the present exemplary embodiment. As illustrated in FIG. 9, the imaging apparatus 30 differs from the imaging apparatus 10 illustrated in FIG. 1 in the point that it includes a video controller 26 and a drive section 28. Configuration is otherwise similar to that of the imaging apparatus 10 and so detailed explanation thereof is omitted.

When the image capture mode is a video mode, the video controller 26 instructs the drive section 28 to thin and read captured images, and also instructs the division controller 20 to perform correction based on line correction data corresponding to thinned and read line image data.

The drive section 28 controls the image pickup device 14 such that image data is output using a thinning method instructed by the video controller 26.

Note that image capture modes include for example a still image mode that captures still images, and video modes such as an HD video mode that thins the captured image and generates High Definition (HD) video data at a comparatively high definition and records this on a recording medium such as a memory card, not illustrated in the drawings, and a through video mode (live view mode) in which a captured image is thinned and a through video of comparatively low definition is output to a display section, not illustrated in the drawings.

Explanation follows regarding processing performed by the imaging apparatus 30 as operation of the present exemplary embodiment.

The processing performed by the imaging apparatus 30 when the image capture mode is a video mode is substantially similar to the processing illustrated in FIG. 7, however at step 100, the image data is read using a thinning method corresponding to the image capture mode. Namely, the video controller 26 instructs the drive section 28 so as to cause the image pickup device 14 to output image data using a thinning method corresponding to the image capture mode. The data controller 16 accordingly reads the thinned line image data according to the image capture mode and stores is sequentially in the image memory 18.

At step 102, the data controller 16 follows instruction from the division controller 20 to divide the image data stored in the image memory 18 into horizontal direction line image data for each line, and to sequentially output the divided line image data to the image capture correction processing section 22.

At step 104, the image capture correction processing section 22 follows instruction from the division controller 20 to read line correction data from the correction table storage section 24 for the thinned and read lines.

Figure 10:
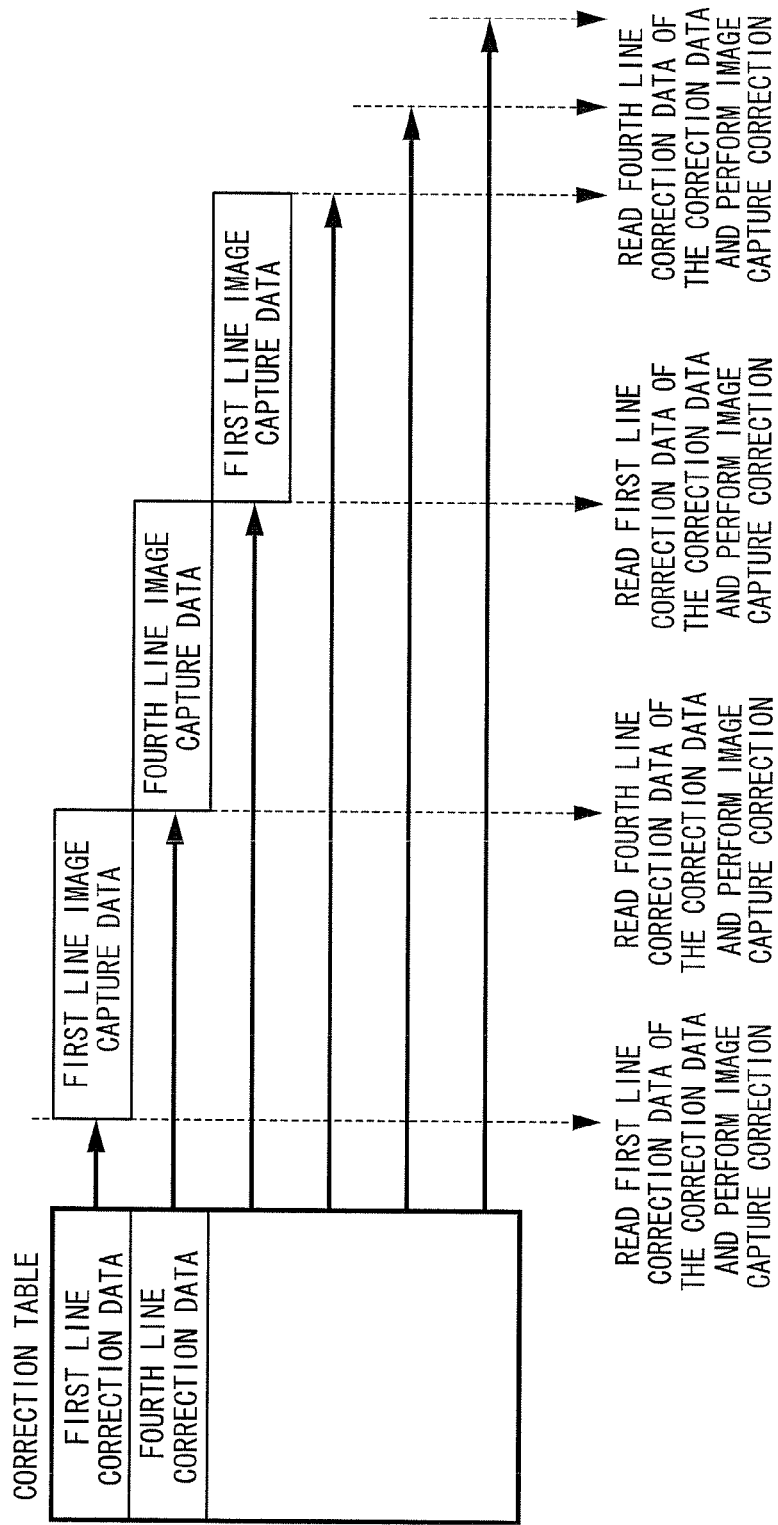
FIG. 10 is a diagram to explain a case in which line correction data is employed to perform correction per line image data in an imaging apparatus according to the second exemplary embodiment.

For example as illustrated in FIG. 10, when the thinned and read lines are the $(n+1)^{th}$ lines and the $(n+4)^{th}$ lines, the first line correction data and the fourth line correction data that correspond thereto are read from the correction table storage section 24.

At step 106, the image capture correction processing section 22 corrects the line image data output from the data controller 16 based on the line correction data read from the correction table storage section 24. Namely, as illustrated in FIG. 10, the line image data of the $(n+1)^{th}$ line and the $(n+4)^{th}$ line are corrected in sequence based on the first line correction data and the fourth line correction data. Similar processing is repeated until it has been performed on all of the thinned and read line image data.

Accordingly in the present exemplary embodiment, when image data is thinned and read when the image capture mode is the video mode, it is sufficient to read the line correction data corresponding to the read line image data, and the correction processing load in the video mode can be reduced.

Third Exemplary Embodiment

Explanation follows regarding a third exemplary embodiment of the present invention. In the present exemplary embodiment, explanation is given regarding a modified example of a color filter.

Figure 11:
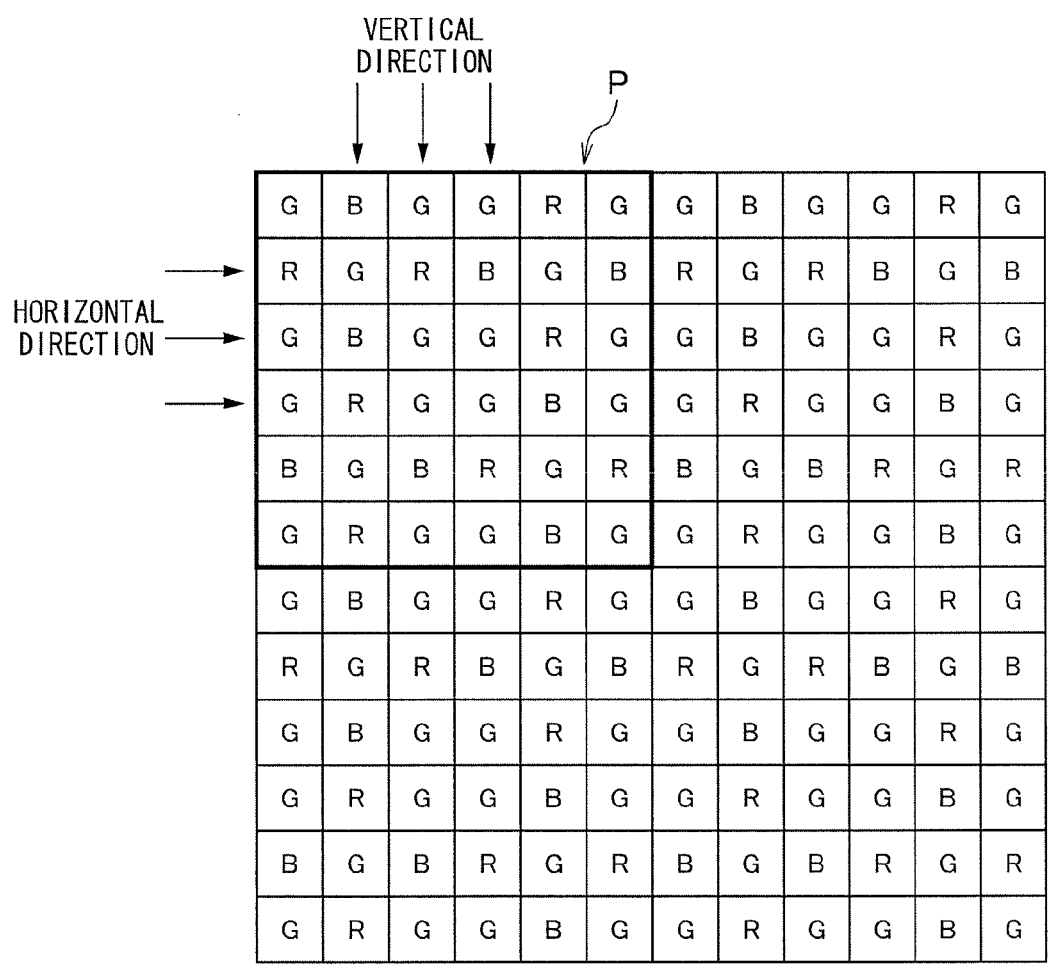
FIG. 11 is a configuration diagram of a color filter according to a third exemplary embodiment.

FIG. 11 illustrates a color filter according to the present exemplary embodiment. As illustrated in FIG. 11, the color filter according to the present exemplary embodiment contains a basic array pattern P (the pattern indicated by the bold frame) configured by a square array pattern corresponding to 6×6 pixels, with the basic array pattern P disposed so as to repeat in both the horizontal direction and the vertical direction. Namely, the color filter is arrayed such that the respective filters of each color R, G, B (the R filters, G filters, B filters) have a specific periodicity.

Moreover, similarly to in the first exemplary embodiment, in the basic array pattern P configuring the color filter array one or more of the filters of each color R, G, B are placed in each line in both the horizontal direction and the vertical direction in the basic array pattern.

The G filters that correspond to brightness system pixels are placed inside the basic array pattern P such that the basic array pattern P contains portions where there are 2 or more of the G filters adjacent to each other in each of the horizontal direction, the vertical direction and the diagonal directions (NE, NW).

Figure 12:
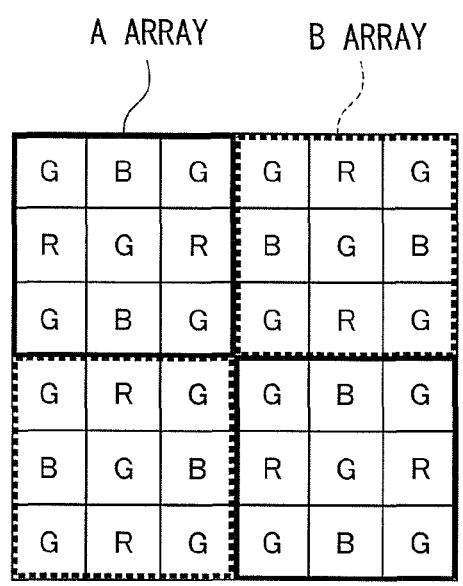
FIG. 12 is a diagram illustrating a basic array pattern contained in a color filter according to the third exemplary embodiment.

FIG. 12 illustrates the basic array pattern P illustrated in FIG. 11 in a state split into 4 groups of 3×3 pixels.

As illustrated in FIG. 12, the basic array pattern P may also be considered an array in which an A array of the 3×3 pixels surrounded by the solid line frame and a B array of the 3×3 pixels surrounded by the broken line frame are arranged alternately along the horizontal direction and the vertical direction.

In both the A array and the B array, the G filters that are brightness system pixels are placed at the 4 corners and at the center, thus being placed over both diagonal lines. In the A array, R filters are placed on both sides of the central G filter in the horizontal direction, and B filters are placed on both sides of the central G filter in the vertical direction. However in the B array, B filters are placed on both sides of the central G filter in the horizontal direction, and R filters are placed on both sides of the central G filter in the vertical direction. Namely, the A array and the B array have reverse positional relationships for the R filters and the B filters, but have similar placement otherwise.

Figure 13:
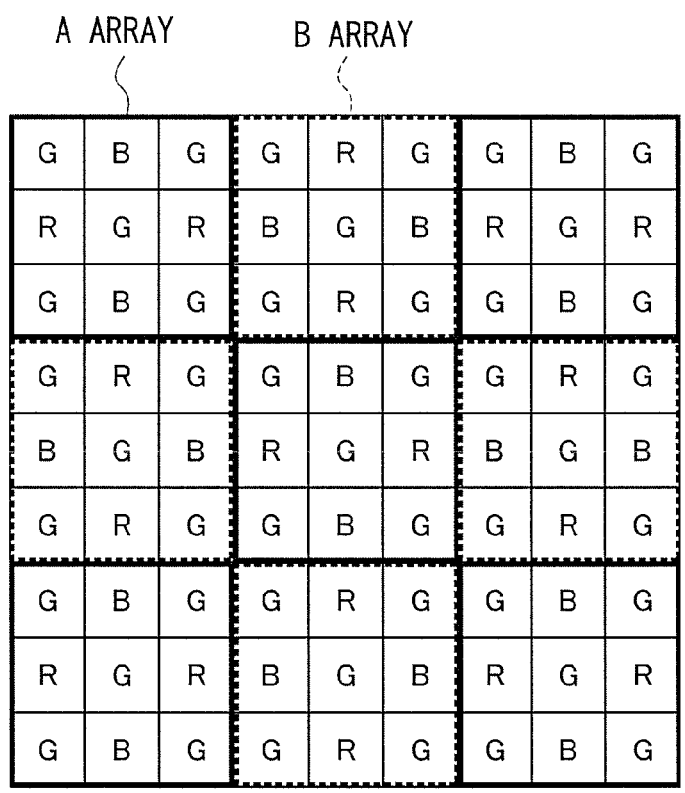
FIG. 13 is a diagram illustrating a color filter in which 6×6 pixel basic array patterns contained in a color filter according to the third exemplary embodiment are split into 3×3 pixel A arrays and B arrays that are repeatedly disposed along a horizontal direction and a vertical direction.

The 4 corner G filters in the A array and the B array form square array G filters corresponding to 2×2 pixels due to disposing the A array and the B array alternately in the vertical direction and the horizontal direction as illustrated in FIG. 13.

Namely, the color filter array (basic array pattern P) illustrated in FIG. 11 includes square arrays corresponding to 2×2 pixels configured by G filters.

Figure 14:
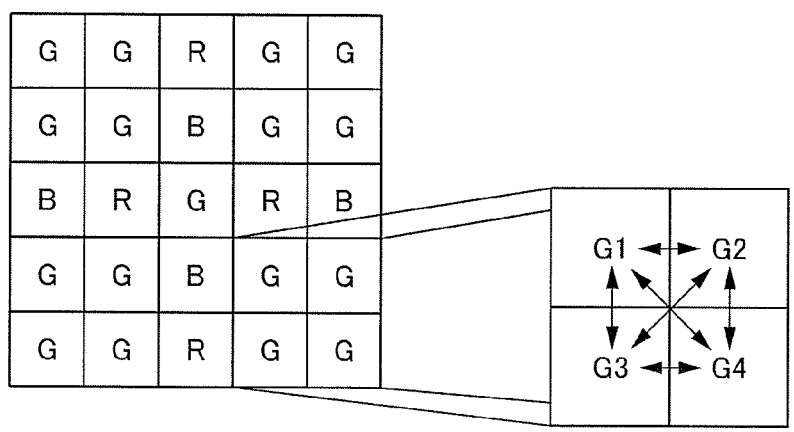
FIG. 14 is a diagram illustrating a distinctive placement of G pixels in a color filter according to the third exemplary embodiment.

When, as illustrated in FIG. 13, in a mosaic image output from the image pickup device 14, a 5×5 pixel local region (the region illustrated by the bold frame) centered on the A array is considered in isolation, the 2×2 G pixels at the 4 corners in the local region are disposed as illustrated in FIG. 14.

As illustrated in FIG. 14, taking the pixel values of the 2×2 G pixels as G1, G2, G3, G4 in sequence from top left to bottom right, the vertical direction difference absolute value of the pixel values of these G pixels is $(|G1-G3|+|G2-G4|)/2$, and the horizontal direction difference absolute value is $(|G1-G2|+|G3-G4|)/2$, the difference absolute value in the bottom left to top right diagonal direction is $|G2-G3|$, and the difference absolute value in the top left to bottom right diagonal direction is $|G1-G4|$.

The correlation (correlation direction) can then be determined as the direction with the smallest difference absolute value out of these four correlation absolute values.

As illustrated in FIG. 13 and FIG. 14, when the 5×5 pixel local region of a mosaic image with the 3×3 pixel A array positioned at its center is considered in isolation, there are 2×2 G pixels placed at the 4 corners of the 5×5 pixel local region. Consequently, when the 3×3 pixels of the A array inside the above local region are pixels subject to synchronization processing, the sums (or the average values) of the correlation absolute values of the 4 corners are derived separately for each direction, and the direction having the smallest value out of the sums (or the average values) of the correlation absolute values for each direction is determined as the brightness correlation direction of the pixels subject to synchronization processing.

Moreover, the basic array pattern P configuring the color filter array illustrated in FIG. 11 has point symmetry about the center of the basic array pattern (the center of the 4 G filters).

As illustrated in FIG. 12, the A array and the B array inside the basic array pattern also respectively have point symmetry about the central G filters, as well as having top-bottom and left-right symmetry (line symmetry).

The color filter of the third exemplary embodiment accordingly has similar features to the features (1), (2), (3) and (4) of the color filter of the first exemplary embodiment.

Moreover, the color filter of the third exemplary embodiment also has the feature that is not present in the color filter of the first exemplary embodiment wherein the G filters are placed in each line in the color filter array diagonal directions (NE, NW), thereby enabling the reproduction precision of synchronization processing to be raised in a high frequency region.

Fourth Exemplary Embodiment

Explanation follows regarding a fourth exemplary embodiment of the present invention. Explanation is given regarding a modified example of a color filter in the present exemplary embodiment.

FIG. 15 illustrates a color filter according to the present exemplary embodiment. As illustrated in FIG. 15, the color filter of the present exemplary embodiment includes a basic array pattern formed from a square array pattern corresponding to 4×4 pixels, with the basic array pattern disposed so as to repeat in the horizontal direction and the vertical direction. Namely, the color filter is arrayed such that the respective filters of each color R, G, B (the R filters, G filters, B filters) have a specific periodicity.

Moreover, in the color filter array illustrated in FIG. 15, one or more of the filters of each color R, G, B are placed in each line in both the horizontal direction and the vertical direction in the basic array pattern.

The G filters that correspond to brightness system pixels are moreover placed inside the basic array pattern such that the basic array pattern contains portions where there are 2 or more of the G filters adjacent to each other in each direction of the horizontal direction, vertical direction and the diagonal directions (NE, NW). The brightness correlation direction of the respective horizontal direction, vertical direction and diagonal directions (NE, NW) can be determined using the smallest pixel separation from the pixel values of the G pixels corresponding to the adjacent G filters.

The basic array pattern configuring the color filter array is point symmetry around the center of the basic array pattern.

The color filter according to the fourth exemplary embodiment has similar features to the features (1), (2), (3) and (4) of the color filter of the first exemplary embodiment.

Fifth Exemplary Embodiment

Explanation follows regarding a fifth exemplary embodiment of the present invention. Explanation is given regarding a modified example of a color filter in the present exemplary embodiment.

FIG. 16 illustrates a color filter according to the present exemplary embodiment. As illustrated in FIG. 16, the color filter of the present exemplary embodiment includes a basic array pattern (the pattern indicated by the bold frame) formed from a square array pattern corresponding to 5×5 pixels, with the basic array pattern disposed so as to repeat in the horizontal direction and the vertical direction. Namely, the color filter array is arrayed such that the respective filters of each color R, G, B (the R filters, G filters, B filters) have a specific periodicity.

Moreover, in the color filter array illustrated in FIG. 16, one or more of the filters of each color R, G, B are placed in each line in both the horizontal direction and the vertical direction in the basic array pattern.

The G filters that correspond to brightness system pixels are moreover placed inside the basic array pattern such that the basic array pattern contains portions where there are 2 or more of the G filters adjacent to each other in each direction of the horizontal direction, vertical direction and the diagonal directions (NE, NW). The brightness correlation direction of the respective horizontal direction, vertical direction and diagonal directions (NE, NW) can be determined using the smallest pixel separation from the pixel values of the G pixels corresponding to the adjacent G filters.

The color filter according to the fifth exemplary embodiment has similar features to the features (1), (2), and (3) of the color filter of the first exemplary embodiment.

Sixth Exemplary Embodiment

Explanation follows regarding a sixth exemplary embodiment of the present invention. Explanation is given regarding a modified example of a color filter in the present exemplary embodiment.

FIG. 17 illustrates a color filter according to the present exemplary embodiment. As illustrated in FIG. 17, the color filter of the present exemplary embodiment includes a basic array pattern (the pattern indicated by the bold frame) formed from a square array pattern corresponding to 7×7 pixels, with the basic array pattern disposed so as to repeat in the horizontal direction and the vertical direction. Namely, the color filter array is arrayed such that the respective filters of each color R, G, B (the R filters, G filters, B filters) have a specific periodicity.

Moreover, in the color filter array illustrated in FIG. 17, filters of each color R, G, B are placed in each line in both the horizontal direction and the vertical direction in the basic array pattern.

The G filters that correspond to brightness system pixels are moreover placed inside the basic array pattern such that the basic array pattern contains portions where there are 2 or more of the G filters adjacent to each other in each direction of the horizontal direction, vertical direction and the diagonal directions (NE, NW). Namely, 4 sets of G pixel clusters containing 2×2 up-down and left-right adjacent G pixels are present in the basic array pattern. The brightness correlation direction of the respective horizontal direction, vertical direction and diagonal directions (NE, NW) can be determined using the smallest pixel separation from the pixel values of the G pixels corresponding to the adjacent G filters.

The basic array pattern configuring the color filter array has point symmetry around the center of the basic array pattern.

The color filter of the sixth exemplary embodiment has similar features to the features (1), (2), (3) and (4) of the color filter of the first exemplary embodiment.

Seventh Exemplary Embodiment

Explanation follows regarding a seventh exemplary embodiment of the present invention. Explanation is given regarding a modified example of a color filter in the present exemplary embodiment.

FIG. 18 illustrates a color filter according to the present exemplary embodiment. As illustrated in FIG. 18, the color filter of the present exemplary embodiment includes a basic array pattern (the pattern indicated by the bold frame) formed from a square array pattern corresponding to 8×8 pixels, with the basic array pattern disposed so as to repeat in the horizontal direction and the vertical direction. Namely, the color filter array is arrayed such that the respective filters of each color R, G, B (the R filters, G filters, B filters) have a specific periodicity.

Moreover, in the color filter array illustrated in FIG. 18, filters of each color R, G, B are placed in each line in both the horizontal direction and the vertical direction in the basic array pattern.

The G filters that correspond to brightness system pixels are moreover placed inside the basic array pattern such that the basic array pattern contains portions where there are 2 or more of the G filters adjacent to each other in each direction of the horizontal direction, vertical direction and the diagonal directions (NE, NW). Namely, 4 sets of G pixel clusters containing 2×2 up-down and left-right adjacent G pixels are present in the basic array pattern. The brightness correlation direction of the respective horizontal direction, vertical direction and diagonal directions (NE, NW) can be determined using the smallest pixel separation from the pixel values of the G pixels corresponding to the adjacent G filters.

The basic array pattern configuring the color filter array has point symmetry around the center of the basic array pattern.

The color filter of the seventh exemplary embodiment has similar features to the features (1), (2), (3) and (4) of the color filter of the first exemplary embodiment.

Note that in the exemplary embodiments described above, explanation has been given regarding a color image pickup device with color filters in the 3 primary colors RGB, however the present invention is not limited thereto. For example, the present invention may also be applied to a 4-color color filter of the 3 primary colors RGB+another color (for example emerald (E)), such as the color filter illustrated in FIG. 19.

In the basic array patterns illustrated for the modified examples of the third exemplary embodiment to the seventh exemplary embodiment, in an imaging apparatus with an image pickup device with an N×N (where N is an integer of 4 or above) square color filter array, horizontal direction line correction data is prepared for each pattern line of the basic array pattern as in the first exemplary embodiment, and image data is divided into line image data and correction is performed per line image data. The correction processing load can accordingly be reduced in comparison to when correction is performed per basic array pattern even when employing a color filter with a large size of basic array pattern (when N is 4 or above), namely a color filter with a lot of color definitions. Note that there is no limitation thereto, and for example line vertical direction correction data may be prepared for each pattern line of the basic array pattern, and image data divided into line image data along the vertical direction and correction performed per line image data.

Similarly, when image data is thinned and read such as when the image capture mode is the video mode, as in the second exemplary embodiment, the correction processing load in the video mode can be reduced by only reading the line correction data that corresponds to the read line image data.

Moreover, the present invention is not limited to color filter arrays in which the basic array pattern is an N×N (where N is an integer of 4 or above) square filter array, and the present invention may be applied even when the basic array pattern has an N×M array (where N and M are integers of 3 or above). However, N and M are preferably 10 or below in consideration of ease of image processing such as thinning processing that is performed during synchronization processing and video capture processing.

Moreover, the present invention may also be applied to a color image pickup device with a 4-color complementary color filter that has G in addition to C (cyan), M (magenta) and Y (yellow), that are complementary colors of the primary colors RGB.

The present invention is moreover not limited to the exemplary embodiments described above, and obviously various modifications are possible within a range not departing from the spirit of the present invention.

What is claimed is:

1. An imaging apparatus comprising:
an image pickup device comprising a plurality of photoelectric conversion elements arrayed in a horizontal direction and a vertical direction;
a color filter that is provided above a plurality of pixels configured by the plurality of photoelectric conversion elements, the color filter having a basic array pattern disposed with a first filter corresponding to a first color that contributes most to obtaining a brightness signal and second filters respectively corresponding to 2 or more second colors other than the first color, with the basic array pattern disposed repeating in the horizontal direction and the vertical direction, and with the first filter placed such that in the basic array pattern there are portions where there are 2 or more of the first filters adjacent to each other in the horizontal direction, the vertical direction and the diagonal directions;
a division section that divides image data output from the image pickup device into line image data running along a predetermined direction for each line;
a storage section for storing line correction data that, when the basic array pattern has been divided into pattern lines running along the predetermined direction, stores line correction data for each pattern line with line correction data configured by a plurality of correction data corresponding to each filter on the pattern line; and
a correction section that reads from the storage section line correction data corresponding to the line image data divided by the division section, and that uses the read line correction data to correct the line image data for each pattern line,,
wherein:
the first color is green (G), and the second colors are red (R) and blue (B), and
the color filter includes a R filter, a G filter and a B filter corresponding respectively to the colors red (R), green (G), and blue (B), and
the color filter is configured by a first array and a second array alternately arrayed in the horizontal direction and the vertical direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

2. The imaging apparatus of claim 1, further comprising:
a thinning section that reads from the image pickup device line image data that is thinned to a predetermined thinning pattern when an image capture mode is a video mode; and wherein
the correction section reads from the storage section line correction data corresponding to the line image data that has been read by the thinning section, and corrects the line image data with the read line correction data.

3. The imaging apparatus of claim 1, wherein:
one or more of the first filter and one or more of each of the second filters respectively corresponding to the second colors are respectively placed in each horizontal direction line and each vertical direction line of the color filter inside the basic array pattern.

4. The imaging apparatus of claim 1, wherein:
the basic array pattern is a square array pattern corresponding to N×N pixels, wherein N is an integer of 4 or above.

5. The imaging apparatus of claim 1, wherein:
the color filter contains a square array corresponding to 2×2 pixels configured by the first filter.

6. The imaging apparatus of claim 1, wherein:
in the color filter, the first filter is respectively placed contiguously in the horizontal direction and the vertical direction on both sides of the filter of any one color out of the second filters.

7. The imaging apparatus of claim 1, wherein:
the color filter has point symmetry about the center of the basic array pattern.

8. An imaging apparatus, comprising:
an image pickup device comprising a plurality of photoelectric conversion elements arrayed in a horizontal direction and a vertical direction;
a color filter that is provided above a plurality of pixels configured by the plurality of photoelectric conversion elements, the color filter having a basic array pattern disposed with a first filter corresponding to a first color that contributes most to obtaining a brightness signal and second filters respectively corresponding to 2 or more second colors other than the first color, with the basic array pattern disposed repeating in the horizontal direction and the vertical direction, and with the first filter placed such that in the basic array pattern there are portions where there are 2 or more of the first filters adjacent to each other in the horizontal direction, the vertical direction and the diagonal directions;
a division section that divides image data output from the image pickup device into line image data running along a predetermined direction for each line;
a storage section for storing line correction data that, when the basic array pattern has been divided into pattern lines running along the predetermined direction, stores line correction data for each pattern line with line correction data configured by a plurality of correction data corresponding to each filter on the pattern line; and
a correction section that reads from the storage section line correction data corresponding to the line image data divided by the division section, and that uses the read line correction data to correct the line image data for each pattern line, wherein:
the first color is green (G), and the second colors are red (R) and blue (B), and
the color filter includes a R filter, a G filter and a B filter corresponding respectively to the colors red (R), green (G), and blue (B); and
the color filter is configured by a first array and a second array alternately arrayed in the horizontal direction and the vertical direction, wherein the first array corresponds to 3×3 pixels with the G filter placed at the center and at the 4 corners, the B filter placed at the top and bottom of the central G filter, and the R filter placed at the left and right of the central G filter, and the second array corresponds to 3×3 pixels with the G filter placed at the center and at the 4 corners, the R filter placed at the top and bottom of the central G filter, and the B filter placed at the left and right of the central G filter.

9. The imaging apparatus of claim 8, further comprising:
a thinning section that reads from the image pickup device line image data that is thinned to a predetermined thinning pattern when an image capture mode is a video mode; and wherein
the correction section reads from the storage section line correction data corresponding to the line image data that has been read by the thinning section, and corrects the line image data with the read line correction data.

10. The imaging apparatus of claim 8, wherein:
one or more of the first filter and one or more of each of the second filters respectively corresponding to the second colors are respectively placed in each horizontal direction line and each vertical direction line of the color filter inside the basic array pattern.

11. The imaging apparatus of claim 8, wherein:
the basic array pattern is a square array pattern corresponding to N×N pixels, wherein N is an integer of 4 or above.

12. The imaging apparatus of claim 8, wherein:
the color filter contains a square array corresponding to 2×2 pixels configured by the first filter.

13. The imaging apparatus of claim 8, wherein:
in the color filter, the first filter is respectively placed contiguously in the horizontal direction and the vertical direction on both sides of the filter of any one color out of the second filters.

14. The imaging apparatus of claim 8, wherein:
the color filter has point symmetry about the center of the basic array pattern.

15. A non-transitory storage medium storing an imaging apparatus control program that causes a computer to control an imaging apparatus comprising:
an image pickup device comprising a plurality of photoelectric conversion elements arrayed in a horizontal direction and a vertical direction,
a color filter that is provided above a plurality of pixels configured by the plurality of photoelectric conversion elements, the color filter having a basic array pattern disposed with a first filter corresponding to a first color that contributes most to obtaining a brightness signal and second filters respectively corresponding to 2 or more second colors other than the first color, with the basic array pattern disposed repeating in the horizontal direction and the vertical direction, and with the first filter placed such that in the basic array pattern there are portions where there are 2 or more of the first filters adjacent to each other in the horizontal direction, the vertical direction and the diagonal directions, and
a storage section for storing line correction data that, when the basic array pattern has been divided into pattern lines running along a predetermined direction, stores line correction data for each pattern line with line correction data configured by a plurality of correction data corresponding to each filter on the pattern line, to function as:
a division section that divides image data output from the image pickup device into line image data running along the predetermined direction for each line; and
a correction section that reads from the storage section line correction data corresponding to the line image data divided by the division section, and that uses the read line correction data to correct the line image data for each pattern line,
wherein:
the first color is green (G), and the second colors are red (R) and blue (B), and the color filter includes a R filter, a G filter and a B filter corresponding respectively to the colors red (R), green (G), and blue (B), and the color filter is configured by a first array and a second array alternately arrayed in the horizontal direction and the vertical direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

16. A control method for an imaging apparatus, the imaging apparatus comprising:
    an image pickup device comprising a plurality of photoelectric conversion elements arrayed in a horizontal direction and a vertical direction,
    a color filter that is provided above a plurality of pixels configured by the plurality of photoelectric conversion elements, the color filter having a basic array pattern disposed with a first filter corresponding to a first color that contributes most to obtaining a brightness signal and second filters respectively corresponding to 2 or more second colors other than the first color, with the basic array pattern disposed repeating in the horizontal direction and the vertical direction, and with the first filter placed such that in the basic array pattern there are portions where there are 2 or more of the first filters adjacent to each other in the horizontal direction, the vertical direction and the diagonal directions, and
    a storage section for storing line correction data that, when the basic array pattern has been divided into pattern lines running along a predetermined direction, stores line correction data for each pattern line with line correction data configured by a plurality of correction data corresponding to each filter on the pattern line, and the control method comprising:
    dividing image data output from the image pickup device into line image data running along the predetermined direction for each line; and
    reading from the storage section line correction data corresponding to the divided line image data, and using the read line correction data to correct the line image data for each pattern line;
    wherein:
    the first color is green (G), and the second colors are red (R) and blue (B), and
    the color filter includes a R filter, a G filter and a B filter corresponding respectively to the colors red (R), green (G), and blue (B), and
    the color filter is configured by a first array and a second array alternately arrayed in the horizontal direction and the vertical direction, wherein the first array corresponds to 3×3 pixels with the R filter placed at the center, the B filter placed at the 4 corners, and the G filter placed at the top, bottom, left and right of the central R filter, and the second array corresponds to 3×3 pixels with the B filter placed at the center, the R filter placed at the 4 corners, and the G filter placed at the top, bottom, left and right of the central B filter.

17. A non-transitory storage medium storing an imaging apparatus control program that causes a computer to control an imaging apparatus comprising:
    an image pickup device comprising a plurality of photoelectric conversion elements arrayed in a horizontal direction and a vertical direction,
    a color filter that is provided above a plurality of pixels configured by the plurality of photoelectric conversion elements, the color filter having a basic array pattern disposed with a first filter corresponding to a first color that contributes most to obtaining a brightness signal and second filters respectively corresponding to 2 or more second colors other than the first color, with the basic array pattern disposed repeating in the horizontal direction and the vertical direction, and with the first filter placed such that in the basic array pattern there are portions where there are 2 or more of the first filters adjacent to each other in the horizontal direction, the vertical direction and the diagonal directions, and
    a storage section for storing line correction data that, when the basic array pattern has been divided into pattern lines running along a predetermined direction, stores line correction data for each pattern line with line correction data configured by a plurality of correction data corresponding to each filter on the pattern line, to function as:
    a division section that divides image data output from the image pickup device into line image data running along the predetermined direction for each line; and
    a correction section that reads from the storage section line correction data corresponding to the line image data divided by the division section, and that uses the read line correction data to correct the line image data for each pattern line,
    wherein:
    the first color is green (G), and the second colors are red (R) and blue (B), and
    the color filter includes a R filter, a G filter and a B filter corresponding respectively to the colors red (R), green (G), and blue (B), and
    the color filter is configured by a first array and a second array alternately arrayed in the horizontal direction and the vertical direction, wherein the first array corresponds to 3×3 pixels with the G filter placed at the center and at the 4 corners, the B filter placed at the top and bottom of the central G filter, and the R filter placed at the left and right of the central G filter, and the second array corresponds to 3×3 pixels with the G filter placed at the center and at the 4 corners, the R filter placed at the top and bottom of the central G filter, and the B filter placed at the left and right of the central G filter.

18. A control method for an imaging apparatus, the imaging apparatus comprising:
    an image pickup device comprising a plurality of photoelectric conversion elements arrayed in a horizontal direction and a vertical direction,
    a color filter that is provided above a plurality of pixels configured by the plurality of photoelectric conversion elements, the color filter having a basic array pattern disposed with a first filter corresponding to a first color that contributes most to obtaining a brightness signal and second filters respectively corresponding to 2 or more second colors other than the first color, with the basic array pattern disposed repeating in the horizontal direction and the vertical direction, and with the first filter placed such that in the basic array pattern there are portions where there are 2 or more of the first filters adjacent to each other in the horizontal direction, the vertical direction and the diagonal directions, and
    a storage section for storing line correction data that, when the basic array pattern has been divided into pattern lines running along a predetermined direction, stores line correction data for each pattern line with line correction data configured by a plurality of correction data corresponding to each filter on the pattern line, and the control method comprising:

dividing image data output from the image pickup device into line image data running along the predetermined direction for each line; and reading from the storage section line correction data corresponding to the divided line image data, and using the read line correction data to correct the line image data for each pattern line, wherein:

the first color is green (G), and the second colors are red (R) and blue (B), and the color filter includes a R filter, a G filter and a B filter corresponding respectively to the colors red (R), green (G), and blue (B), and the color filter is configured by a first array and a second array alternately arrayed in the horizontal direction and the vertical direction, wherein the first array corresponds to 3×3 pixels with the G filter placed at the center and at the 4 corners, the B filter placed at the top and bottom of the central G filter, and the R filter placed at the left and right of the central G filter, and the second array corresponds to 3×3 pixels with the G filter placed at the center and at the 4 corners, the R filter placed at the top and bottom of the central G filter, and the B filter placed at the left and right of the central G filter.

* * * * *